United States Patent
Ting et al.

(10) Patent No.: US 7,599,061 B1
(45) Date of Patent: Oct. 6, 2009

(54) ULTRA COMPACT SPECTROMETER APPARATUS AND METHOD USING PHOTONIC CRYSTALS

(75) Inventors: David Z. Ting, Arcadia, CA (US); Cory J. Hill, Pasadena, CA (US); Sumith V. Bandara, Stevenson Ranch, CA (US); Sarath D. Gunapala, Stevenson Ranch, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 11/188,226

(22) Filed: Jul. 21, 2005

(51) Int. Cl.
*G01J 3/28* (2006.01)
(52) U.S. Cl. .................................... 356/326
(58) Field of Classification Search ................. 356/326
See application file for complete search history.

(56) References Cited

U.S. PATENT DOCUMENTS

| | | | | |
|---|---|---|---|---|
| 6,404,947 | B1* | 6/2002 | Matsuda | 385/24 |
| 6,593,894 | B1 | 7/2003 | Biswas et al. | |
| 6,674,778 | B1 | 1/2004 | Lin et al. | |
| 7,187,491 | B1* | 3/2007 | Bratkovski | 359/321 |
| 2001/0012149 | A1 | 8/2001 | Lin et al. | |
| 2002/0027696 | A1* | 3/2002 | Baba et al. | 359/196 |
| 2002/0063941 | A1 | 5/2002 | Matsushita et al. | |
| 2002/0085801 | A1 | 7/2002 | Okayama | |
| 2002/0088929 | A1* | 7/2002 | Kittaka et al. | 250/226 |
| 2002/0135853 | A1 | 9/2002 | Scalora | |
| 2002/0167984 | A1 | 11/2002 | Scherer | |
| 2002/0197042 | A1 | 12/2002 | Kittaka et al. | |
| 2003/0010984 | A1 | 1/2003 | Bosco et al. | |
| 2003/0123827 | A1 | 7/2003 | Salerno et al. | |
| 2003/0161577 | A1 | 8/2003 | Wilson et al. | |
| 2003/0174402 | A1* | 9/2003 | Kittaka et al. | 359/558 |
| 2003/0223117 | A1 | 12/2003 | Nakazawa et al. | |
| 2004/0008437 | A1 | 1/2004 | Kittaka et al. | |
| 2005/0271322 | A1* | 12/2005 | Oya et al. | 385/24 |

FOREIGN PATENT DOCUMENTS

WO 99/19754 4/1999

OTHER PUBLICATIONS

Momenti, B. and Adibi, A., "Optimization of photonic crystal demultiplexers based on the superprism effect", Oct. 14, 2003, Applied Physics B: Lasers and Optics, vol. 77, p. 555-560.*
Kosaka, et al. ("Superprism Phenomena in Photonic Crystals: Toward Microscale Lightwave Circuits", Nov. 1999, Journal of Lightwave Technology, vol. 17, No. 11.*

(Continued)

*Primary Examiner*—Kara E Geisel
(74) *Attorney, Agent, or Firm*—Mark Honer (57) ABSTRACT

The present invention is directed to methods of photonic crystal formation, and to methods and apparatus for using such photonic crystals, particularly in conjunction with detector arrays. Photonic crystal parameters and detector array parameters are compared to optimize the selection and orientation of a photonic crystal shape. A photonic crystal is operatively positioned relative to a plurality of light sensors. The light sensors can be separated by a pitch distance and positioned within one half of the pitch distance of an exit surface of the photonic crystals.

11 Claims, 5 Drawing Sheets

OTHER PUBLICATIONS

Gerken, M., and Miller, D.A.B., "Multilayer thin-film structures with high spatial dispersion", Mar. 1, 2003, Applied Optics, vol. 42, No. 7.*

Gralak, B., Enoch, S. And Tayeb, G., "Anomalous refractive properties of photonic crystals", Jun. 2000, Journal of the Optical Society of America, vol. 17, No. 6.*

* cited by examiner

ULTRA COMPACT SPECTROMETER APPARATUS AND METHOD USING PHOTONIC CRYSTALS

STATEMENT REGARDING FEDERALLY SPONSORED RESEARCH

The invention described hereunder was made in the performance of work under a NASA contract, and is subject to the provisions of Public Law #96-517 (35 U.S.C. §202) in which the Contractor has elected not to retain title.

FIELD OF THE INVENTION

The present invention relates generally to spectrometers, and more particularly to an ultra-compact spectrometer apparatus and method using photonic crystals having very strong color dispersion characteristics.

BACKGROUND OF THE INVENTION

Previously, prisms or photonic elements were constructed using ordinary dielectric materials having common optical characteristics. Small or ultra-compact spectrometer constructed using these ordinary dielectric materials were limited regarding the amount of dispersion that was possible due to the reduced physical dimensions of the ordinary dielectric device.

This limited dispersion capability had the effect that only wavelengths within a relatively narrow range were detectable since the physical size limitation prevented wider dispersion. Further, even if wider dispersion was available, the relatively wide band of frequencies produced still lacked narrow band filtering to detect small differences in wavelengths. Thus, there remains a need for strong dispersion in an ultra compact spectrometer along with narrow band filtering in order to detect particular wavelength components present within a polychromatic wave.

A photonic crystal is a periodic structure consisting typically of two dielectric materials with high dielectric (k) contrast such as that between a semiconductor and air, for example, and with geometrical feature sizes comparable to or smaller than light wavelengths of interest. As an engineered structure or artificially engineered material, a photonic crystal can exhibit optical properties not commonly found in natural substances.

Properly designed photonic crystals can have color dispersion capabilities over certain prescribed frequency ranges that are one or two orders of magnitude stronger than those of ordinary dielectric materials. Further, extensive research has led to the discovery of several classes of photonic crystal structures for which the propagation of electromagnetic radiation is forbidden in certain frequency ranges. These forbidden frequency ranges can be called "photonic band gaps" (PBGs).

More recently, it has also been realized that electromagnetic radiation with frequencies adjacent to the boundaries of the photonic bands themselves can propagate quite differently than they would in ordinary optical materials, and can exhibit much stronger color dispersions via what can be called superprism effects.

SUMMARY OF THE INVENTION

The present invention is directed to methods of photonic crystal formation, and to methods and apparatus for using such photonic crystals, particularly in conjunction with detector arrays.

One exemplary embodiment of the invention is a method of selecting an orientation for an exit surface of a photonic crystal, the method comprising: identifying a plurality of wavelengths; identifying a set of photonic crystal parameters; using the identified set of parameters to obtain a plurality of sets of data points, where each data point of each set of data points relates to an exit point position on the exit surface of a wavelength of the plurality of wavelengths, and each set of data points corresponds to an orientation of the exit surface; and using the plurality of sets of data points to select an orientation for the exit surface.

Another exemplary embodiment of the invention is a method of determining the shape of a photonic crystal comprising: identifying a set of detector array parameters; identifying a set of photonic crystal parameters; and determining at least one photonic crystal shape related value using the identified set of detector array parameters and the identified set of photonic crystal parameters.

Yet another exemplary embodiment of the invention is a method of orienting a photonic crystal comprising: identifying a plurality of wavelengths; obtaining a plurality of sets of data points, where each data point of each set of data points relates to an exit point position on the exit surface of a wavelength of the plurality of wavelengths, and each set of data points corresponds to an orientation of the photonic crystal; and using the plurality of sets of data points to orient the photonic crystal.

Still another exemplary embodiment of the invention is an apparatus comprising: a photonic crystal having at least an entry surface and an exit surface; where the entry surface and exit surface form an angle of between 70 degrees and 130 degrees.

Another exemplary embodiment of the invention is an apparatus comprising: a photonic crystal; a plurality of light sensors positioned to sense light exiting a surface of the photonic crystal, the plurality of light sensors comprising a first end sensor, a second end sensor, and one or more intermediate sensors positioned between the first end sensor and the second end sensor; for each intermediate sensor of the at least one intermediate sensors the intermediate sensor is separated from a first adjacent sensor by a first distance, the intermediate sensor is separated from a second adjacent sensor by a second distance, the larger of the first and second differences is less than X% larger than the smaller of the first and second differences where X is 10.

Yet another exemplary embodiment of the invention is an apparatus comprising: a photonic crystal; and a plurality of light sensors separated from each other by a pitch distance and positioned within one half of the pitch distance of an exit surface of the photonic crystal.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION OF THE PREFERRED EMBODIMENTS

Reference will now be made to the preferred embodiments of the invention, examples of which are illustrated in the accompanying drawings. While the invention will be described in conjunction with the preferred embodiments, it will be understood that these embodiments are not intended to limit the invention. On the contrary, the invention is intended to cover alternatives, modifications and equivalents, which may be included within the spirit and scope of the invention as defined by the appended claims.

In the following detailed description, numerous specific details are set forth in order to provide a thorough understanding of the present invention. However, it will be understood by one of ordinary skill in the art that the present invention may be practiced without these specific details. In other instances, well known methods, procedures, components, and circuits have not been described in detail so as not to unnecessarily obscure the important aspects of the present invention.

It is contemplated that the methods and apparatus described herein may, individually or in combination, be incorporated into, or used to form, a variety of apparatus including detector array assemblies and spectrometers. A detector array assembly, as the term is used herein, comprises one or more photonic crystals to direct light to a plurality of light sensors that are part of a detector array. A detector array, as the term is used herein, is a set of sensors which are positioned relative to each other to accomplish a specific purpose, which in some instances will be combined as a pre-fabricated component. A spectrometer, as used herein, is an apparatus that includes at least one detector array assemblies, as well as various supporting members. Such supporting members would at least route light from the outside of the spectrometer to the one or more detector array assemblies, and provide a mechanism to detect and/or measure output information relating to component wavelengths of such light and to output such information.

Figure 1:
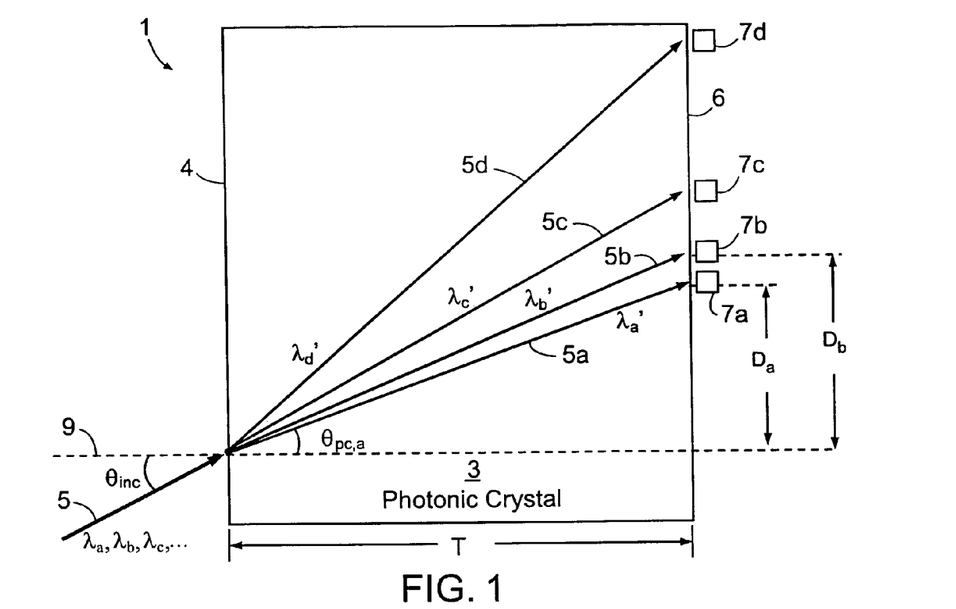
FIG. 1 illustrates diffraction of a ray of light within a photonic crystal where the light includes component frequencies $\lambda_a$, $\lambda_b$, $\lambda_c$ and $\lambda_d$.

In FIG. 1, an apparatus 1 includes a photonic crystal 3 and a plurality of targets 7a, 7b, 7c, and 7d. The apparatus 1 can operate as a spectrometer if the targets 7a, 7b, 7c, and 7d are sensors that provide an indication of whether the intensity of light emitted from the surface of the PC 3 adjacent their respective positions exceeds a threshold value, or provide a measure of the intensity of such light. In some instances the sensors 7a, 7b, 7c, and 7d may each be optimized to detect and/or measure a particular wavelength or range of wavelengths of light.

For illustrative purposes, a polychromatic beam of light 5 can be viewed as intersecting the surface 4 of the crystal 3 at an angle of incidence $\theta_{inc}$. If the beam 5 comprises multiple wavelengths, component wavelengths will be defracted within the PC 3 with a different defraction angle $\theta_{PC}$ for each component wavelength. This is illustrated in FIG. 1 with beams 5a, 5b, 5c, and 5d that each comprise a different component wavelength $\lambda_a$, $\lambda_b$, $\lambda_c$, or $\lambda_d$. In FIG. 1, the angle $\theta_{PC,a}$ corresponds to the defraction angle for the beam 5a and wavelength wavelength $\lambda_a$. Surfaces 4 and 6 of PC 3 are parallel to each other, and are separated by distance T. In FIG. 1, the distances $D_a$ and $D_b$ are the distances of the targets 7a and 7b, respectively, from the point at which line 9 exits the surface 6, where the line 9 is perpendicular to the surfaces 4 and 6, and passes through the point at which the beam 5 intersects the surface 4.

In FIG. 1, $\lambda_a$, $\lambda_b$, $\lambda_c$, or $\lambda_d$ are linearly related to each other in that $\lambda_b=\lambda_a+C$ $\lambda_c=\lambda_b+C$, and $\lambda_d=\lambda_c+C$ where C is a constant. However, as can be seen in FIG. 1, the spacing between the targets 7a and 7b differs from that between 7b and 7c, and both of those differ from the spacing between 7c and 7d. The non-linearity in space is a result of a non-linear relationship between wavelength and defraction angle ($\theta_{PC}$). In FIG. 1, linear changes between component wavelengths $\lambda_a$, $\lambda_b$, $\lambda_c$, or $\lambda_d$ result in non-linear distances between exit points on surface 6 for the component wavelengths $\lambda_a$, $\lambda_b$, $\lambda_c$, or $X_d$, and the positions of the targets 7a-7d that are intended to detect and/or measure the component wavelengths $\lambda_a$, $\lambda_b$, $\lambda_c$, or $\lambda_d$.

Figure 2:
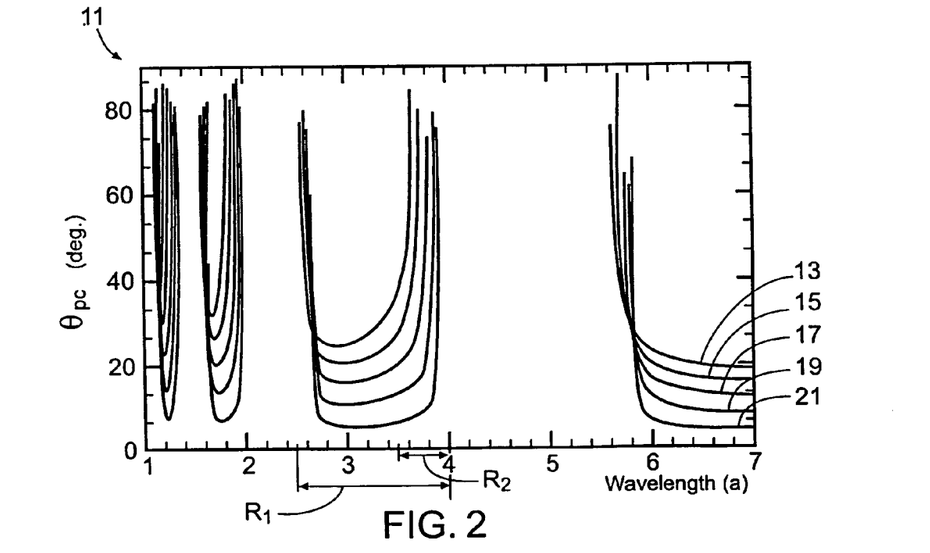
FIG. 2 illustrates the relationship between wavelength and angle of refraction, $\theta_{pc}$, in the photonic crystal of FIG. 1 for different angles of incidence, $\theta_{inc}$.
Figure 3:
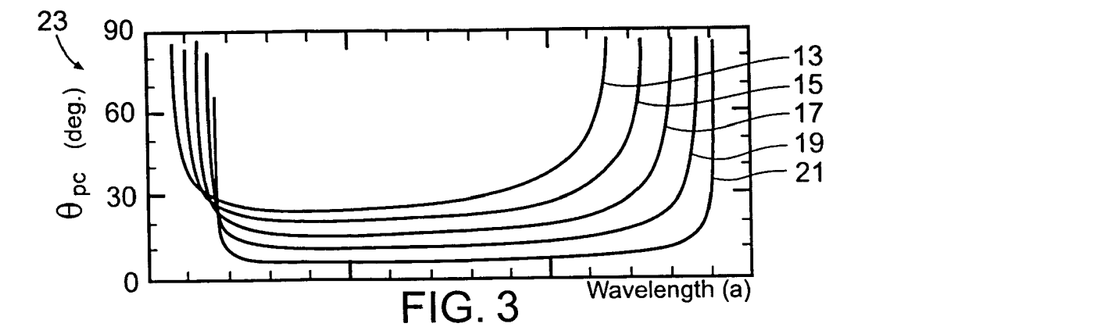
FIG. 3 provides a closer look of the relationship illustrated in FIG. 2 over a range of wavelengths extending between photonic band gaps.
Figure 4:
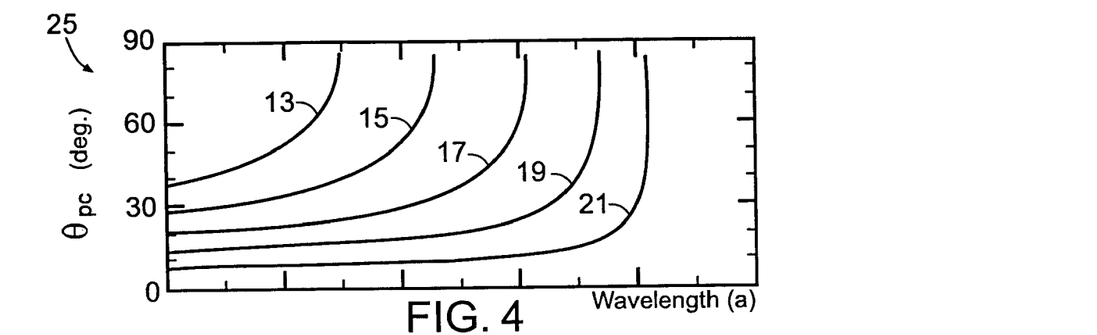
FIG. 4 provides an even closer look of the relationship illustrated in FIGS. 2 and 3 over a narrower range of wavelengths.

In FIG. 2, a graph 11 illustrates the dispersion relationship between wavelength (a) and the defraction angle ($\theta_{PC}$), computed for a sample one-dimensional photonic crystal structure consisting of two layers of two planar dielectric materials per (repeating) period. The alternating layers have thicknesses h1 and h2, and dieletric relative permitivities $\epsilon_1$ and $\epsilon_2$, respectively. The structure repeats with periodicity a=h1+h2. Each of the curves 13, 15, 17, 19, and 21 correspond to a different angle of incidence $\theta_{inc}$ where an angle of incidence $\theta_1$=10 degrees results in curve 13, $\theta_2$=20 results in curve 15, $\theta_3$=30 degrees results in curve 17, $\theta_4$=40 degrees results in curve 19, and $\theta_5$=50 degrees results in curve 21. As can be seen, the relationship between wavelength and detraction angle ($\theta_{PC}$) is extremely non-linear. The graph 11 was obtained with (and graphs 23 and 25 of FIGS. 3 and 4) $h_1$=0.6a, $\epsilon_1$=9.264, $n_1$=3.0437, $h_2$=0.4a, $\epsilon_2$=1, and $n_2$=1.0. The graph 23 of FIG. 3 provides a closer look of the curves 13, 15, 17, 19, and 21 over a range R1 (shown in FIG. 2), and the graph 25 of FIG. 4 provides an even closer look over a range R1 (shown in FIG. 2). As can be seen by reference to the graph 25 of FIG. 4, even over small wavelength ranges, the relationship be wavelength (a) and defraction angle ($\theta_{PC}$) is extremely non-linear.

Figure 5:
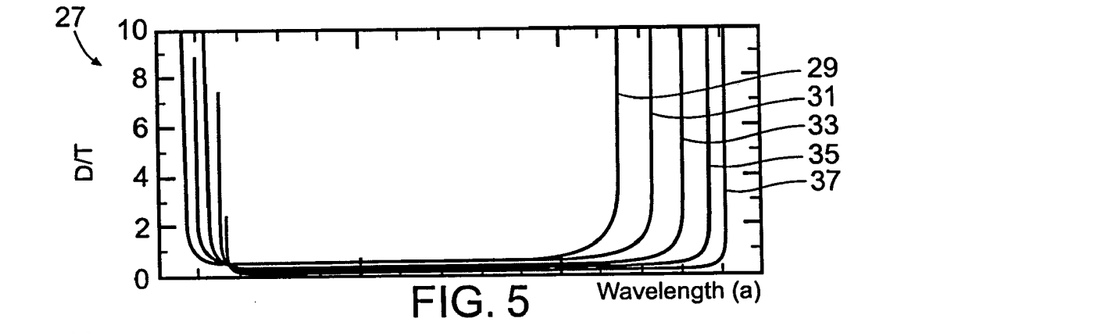
FIG. 5 illustrates the relationship between wavelength and the ratio D/T over the range of wavelengths of FIG. 3.
Figure 6:
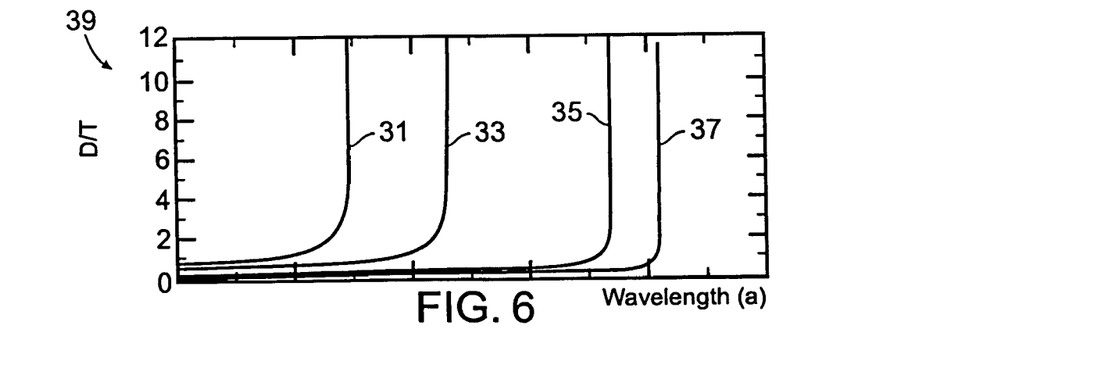
FIG. 6 provides a closer look at the relationship of FIG. 5 over the range of wavelengths of FIG. 4.

FIGS. 5 and 6 includes graphs 27 and 39 which illustrate the impact of the non-linear dispersion relationship on the position of the targets 7a-7d. They do so by showing the relation of the ratio D/T where T is constant for a particular PC, and D is wavelength dependent. The graph 27 of FIG. 5 corresponds to the range R1 as did FIG. 3. The graph 39 of FIG. 6 corresponds to the range R2 as did FIG. 4. As can be seen, the non-linear dispersion relationship results in a non-linear relationship between target positions.

The non-linear relationship between wavelength and defraction angle is desirable because it permits detection of separate component wavelengths that are very close together. It is undesirable to the extent that it makes it difficult to determine where to position sensors (targets 7a-7d). As such, it is desirable to overcome the non-linear effects of the superprism effect on sensor position without sacrificing increased dispersion.

Figure 7:
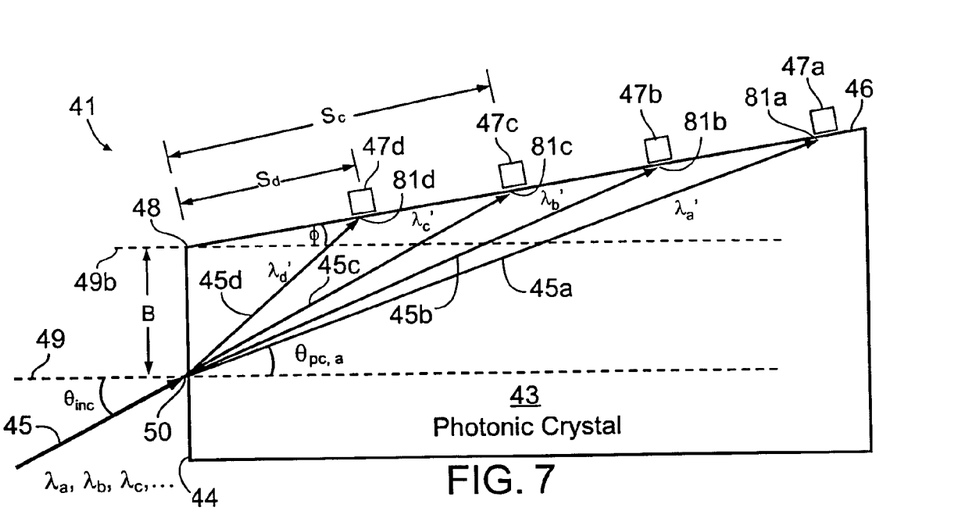
FIG. 7 illustrates diffraction of a ray of light within a photonic crystal where the light includes component frequencies $\lambda_a$, $\lambda_b$, $\lambda_c$ and $\lambda_d$, the angle between the entry and exit surfaces set, and the angle of incidence chosen such that target sensors can be substantially evenly spaced along a surface of the photonic crystal in accordance with an exemplary embodiment of the invention.

One method of overcoming the non-linear effects of the superprism effect without sacrificing increased dispersion is to modify the cross-sectional shape of the PC to compensate for the non-linearities introduced. Referring to FIG. 7, an apparatus 41 includes a PC 43 that differs from the PC 3 in that it has a reduced height such that the component wavelengths exit the crystal via a top surface 46 rather than a back surface (surface 6 in FIG. 1). As such, the entry surface 44 and exit surface 46 are angled relative to each other, and proper selection of the angle they form (the "exit surface angle") can be used to minimize undesirable superprism effects on target positioning.

The apparatus 41 of FIG. 7 includes the same components as the apparatus 1 of FIG. 1, but includes PC 43 which is shaped differently than PC 3 of FIG. 1. More particularly, the apparatus 41 includes a photonic crystal 43 and a plurality of targets 47a, 47b, 47c, and 47d. As in FIG. 1, for illustrative purposes, a beam of light 45 can be viewed as intersecting the surface 44 of the crystal 43 at point 50 and at an angle of incidence $\theta_{inc}$. If the beam 45 comprises multiple wavelengths, component wavelengths will be defracted within the PC 43 with a different defraction angle $\theta_{PC}$ for each component wavelength. This is illustrated in FIG. 7 with beams 45a, 45b, 45c, and 45d that each comprise a different component wavelength $\lambda_a, \lambda_b, \lambda_c,$ and $\lambda_d$ of the beam 45. In FIG. 7, the angle $\theta_{PC,a}$ corresponds to the defraction angle for the beam 45a and wavelength wavelength $\lambda_a$. The surfaces 44 and 46 of PC 43 are not parallel to each other, and in the PC 43 shown, intersect. The distance B is the distance between the point of intersection 50 of the beam 45 with the surface 44 and the nearest point 48 on the line of intersection of the surfaces 44 and 45. In FIG. 7, the distances $S_d$ and $S_c$ are the distances of the exit points 81d and 81c of the component beams 45d and 45c, respectively, from the point 48. The positioning of the targets 47a-47d corresponds to the exits points 81a-81d of the component beams 45a-45d.

In FIG. 7, $\lambda_a, \lambda_b, \lambda_c,$ or $\lambda_d$ are, as they were in FIG. 1, linearly related to each other in that $\lambda_b = \lambda_a + C$, $\lambda_c = \lambda_b + C$, and $\lambda_d = \lambda_c + C$ where C is a constant and is the same constant as that relating the component wavelengths of FIG. 1. However, as can be seen in FIG. 7, the spacing between the targets 47a-47d is much more linear than the spacing between the targets 7a-7d of FIG. 1. The increased linearity is a result of careful selection of the exit surface angle Φ, and angle of incidence $\theta_{inc}$.

The exit surface angle Φ is a measure of the relative angle between the entry surface 44 and the exit surface 46. As shown in FIG. 7, the line 49 is a line normal to the surface 44 at the point of intersection of the beam 45 and the surface 44. The line 49b is a line that passes through the point 48 on the line of intersection between the surfaces 44 and 46, and is also a line that is parallel to line 49. The exit surface angle Φ is the angle between line 49 and the plane of the surface 46.

The relationship between wavelength and defraction angle for PC 43 of FIG. 7 is identical to that of PC 3 of FIG. 1, and is illustrated by FIGS. 3-6. Changing the shape of the PC does not change the non-linearity of the relationship between wavelength and defraction angle, so the superprism effect is still caused by PC 43 of FIG. 7, and can be used for increased dispersion and increased separation of the targets 47a-47d. However, a close look at the relationship between wavelength and the ratio S/B as shown in FIGS. 8 and 9 shows a much more linear relationship over a small range of wavelengths than that between wavelength and the ratio D/T as shown in FIGS. 5 and 6.

Figure 8:
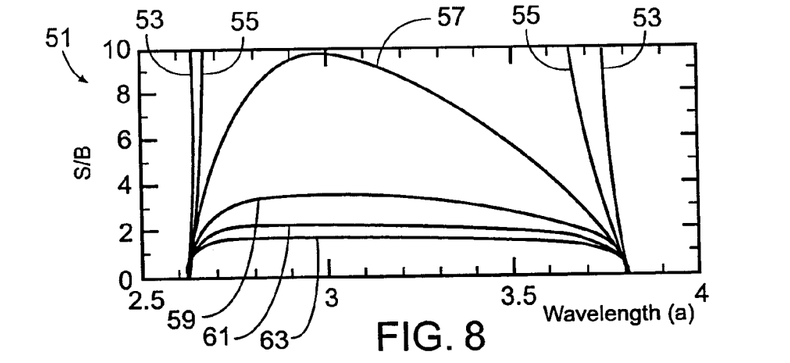
FIG. 8 illustrates the relationship between wavelength and the ratio S/B over the range of wavelengths of FIG. 3 for different exit surface angles, $\Phi$, and a fixed angle of incidence, $\theta_{inc}$.
Figure 9:
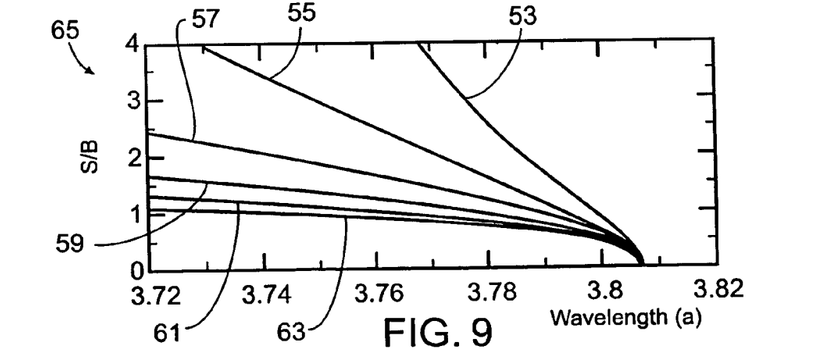
FIG. 9 provides a closer look at the relationship illustrated in FIG. 8 over approximately the range of wavelengths of FIG. 4.

In FIGS. 8 and 9, S and B are the distances described above with B being constant, and S being wavelength dependent. FIGS. 8 and 9 show the relationship between wavelength and the ratio D/T over the same wavelength ranges, R1 and R2, that FIGS. 5 and 6 illustrate the relationship between wavelength and the ratio S/B. In the graphs 51 and 65 of FIGS. 8 and 9, the curves 53, 55, 57, 59, 61 and 63 correspond to different exit surface angles (Φ) for a fixed angle of incidence ($\theta_{inc}$), where the curve 53 corresponds to an exit surface angle Φ=−20°; the curve 55 corresponds to an exit surface angle Φ=−10°; the curve 57 corresponds to an exit surface angle Φ=0°, the curve 59 corresponds to an exit surface angle Φ=10°, the curve 61 corresponds to an exit surface angle Φ=20°, and the curve 63 corresponds to an exit surface angle Φ=30°.

As can be seen, the curves differ in regard to linearity and in regard to the slope of the lines they approximate. As such, selection of an exit surface angle can be done to obtain a more linear spacing of exit points (81a-81d in FIG. 7), and to obtain a desired amount of spacing where selecting a surface angle that produces a curve with greater slope results in greater spacing between exit points.

Figure 10:
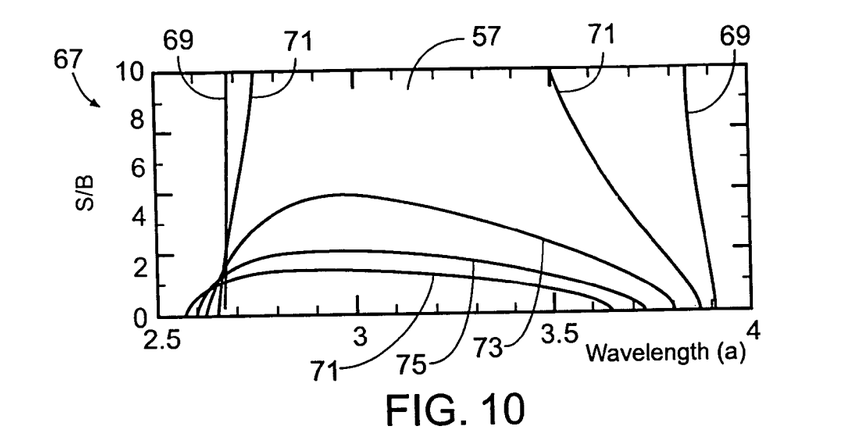
FIG. 10 illustrates the relationship between wavelength and the ratio S/B over the range of wavelengths of FIG. 3 for different angles of incidence, $\theta_{inc}$, and a fixed exit surface angle $\Phi$.
Figure 11:
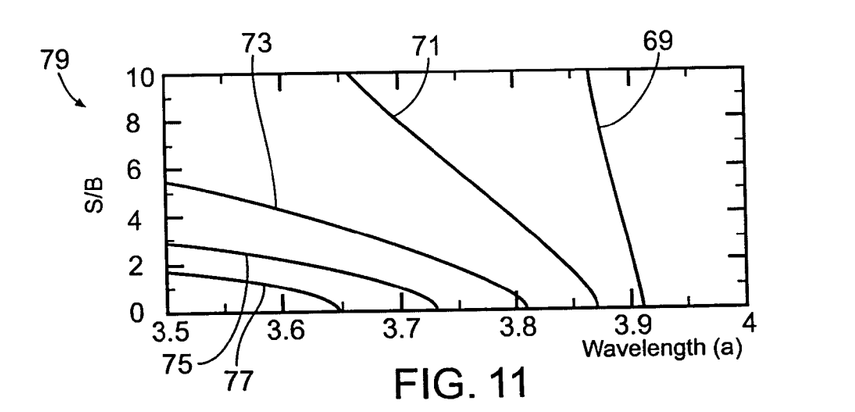
FIG. 11 provides a closer look at the relationship illustrated in FIG. 10 over approximately the range of wavelengths of FIG. 4.

In the graphs 67 and 79 of FIGS. 10 and 11, the curves 69, 71, 73, 75 and 77 correspond to different angles of incidence ($\theta_{inc}$) for a fixed exit surface angle of 10°, where the curve 69 corresponds to an angle of incidence $\theta_{inc}=10$, the curve 71 corresponds to $\theta_{inc}=20$, the curve 73 corresponds to $\theta_{inc}=30$, the curve 75 corresponds to $\theta_{inc}=40$, and the curve 77 corresponds to $\theta_{inc}=50$.

As with the curves of FIGS. 8 and 9, linearity and slope varies with changes in the angle of incidence $\theta_{inc}$. As such, the angle of incidence $\theta_{inc}$ provides an alternative or additional means of obtaining a desired amount of linearity and a desired slope. It is currently preferred to select both an exit surface angle Φ, and an angle of incidence $\theta_{inc}$ to compensate for superprism effects on exit point and target positions. As the exit surface angle will generally be set once the PC 43 is manufactured, initial compensation can be obtained by selection of an exit surface angle Φ, and fine tuning by selection of an appropriate angle of incidence $\theta_{inc}$.

In some instances, selecting an orientation for an exit surface of a photonic might include: (a) identifying a plurality of wavelengths; (b) identifying a set of photonic crystal parameters; (c) using the identified set of parameters to obtain a plurality of sets of data points, where each data point of each set of data points relates to an exit point position on the exit surface of a wavelength of the plurality of wavelengths, and each set of data points corresponds to an orientation of the exit surface; and (d) using the plurality of sets of data points to select an orientation for the exit surface.

Step (a), identifying a plurality of wavelengths facilitates optimizing a photonic crystal for use with a particular range of wavelengths. Specifying the range using a minimum and maximum wavelength, and one or more intermediate wavelengths will generally allow a more informed selection of exit surface angle. Ideally, each wavelength (or sub-range of wavelengths) to be detected and/or measured would be used. Identifying, as the term is used herein, includes measuring, receiving, and/or retrieving the needed information in a format that permits it to be used in the manner described, or converted to a format that permits it to be used in such a manner, and includes both manual and automated methods.

Step (b), identifying a set of photonic crystal parameters comprises obtaining or measuring those characteristics of the photonic crystal necessary to determine where exit points for the identified wavelengths will be for different exit surface angles. The identified set of photonic crystal parameter may include one or more of the following: periodicity, dimensionality, dielectric contrast, unit cell geometry.

The results of one method of implementing step (c) are illustrated above in the graphs of FIGS. 8 and 9. In FIGS. 8-9, each curve represents a set of data points where each data point used to form a curve relates to a wavelength specific exit point position on the exit surface 46 of the PC 43. As each curve relates to a different orientation of the exit surface 46, each set of data points used to form a curve corresponds to an orientation of the exit surface 46.

Step (d), using the plurality of sets of data points to select an orientation for the exit surface may be accomplished manually by visually comparing curves such as those in FIGS. 8 and 9. Alternatively automated methods might be used to determine which set of data points corresponds to a desired orientation of the exit surface. If automated methods are used, selection is more likely to be based on the results of a computation utilizing data point information rather than on the visual representation of the data points.

In some instances, using the data points to select an orientation may comprise obtaining a best fit line for each set of data points and selecting the exit surface angle which corresponds to a set of data points having a line that is statistically a good fit with the data points and/or has an acceptable slope. In regard to the graphs in FIGS. 8 and 9, a steeper slope would indicate a need for a larger (longer along a line of targets) exit surface for a given range of wavelengths than would a more gentile slope, but would also indicate the ability to obtain better resolution over of individual wavelengths in that range.

If automated methods are used, more complex algorithms might be used to compare data sets to determine which set represents an optimum exit surface angle for a given application. As an example, in some instances obtaining an indication of the linearity of each set of data points for use in selecting an exit surface angle may utilize something other than a best fit line method. As another example, if detection and/or measurement of several frequencies is desired, but the frequencies are not evenly distributed over a range, i.e. are not linearly related, then exit points for various exit angles might be calculated to determine which angle most facilitates the positioning of any sensors needed to detect and/or measure the frequencies of interest. As such, compensation for superprism effects may in some instances comprise selecting an angle that results in a more desired non-linear distribution then in a more linear distribution of exit point positions.

It is contemplated that in some instances, particularly using automated methods, it is desirable to determine the shape of a photonic crystal based on desired characteristics of a set of sensors or other form of detector array. In such an instance, a method of determining the shape of a photonic crystal could include: (a) identifying a set of detector array parameters; (b) identifying a set of photonic crystal parameters; and (c) determining at least one photonic crystal shape related value using the identified set of detector array parameters and the identified set of photonic crystal parameters.

The parameters identified in step (a) might include one or more of the following: wavelengths to be detected and/or measured, number of sensors, desired sensor positions and/or position relationships, and size of the exit surface. Step (b), identifying a set of photonic crystal parameters comprises obtaining or measuring those characteristics of the photonic crystal necessary to determine where exit points for the identified wavelengths will be for different exit surface angles. Step (c) involves utilizing the information identified in steps (a) and (b) to determine at least one, and preferably all unknown, photonic crystal shape related values. Such values might include but are not necessarily limited to: exit surface angle, exit surface dimension, entry surface dimensions, cross-sectional shape, dimensions of one or more surfaces other than the entry and exit surfaces, photonic crystal thickness, and/or a preferred photonic crystal material.

Figure 12:
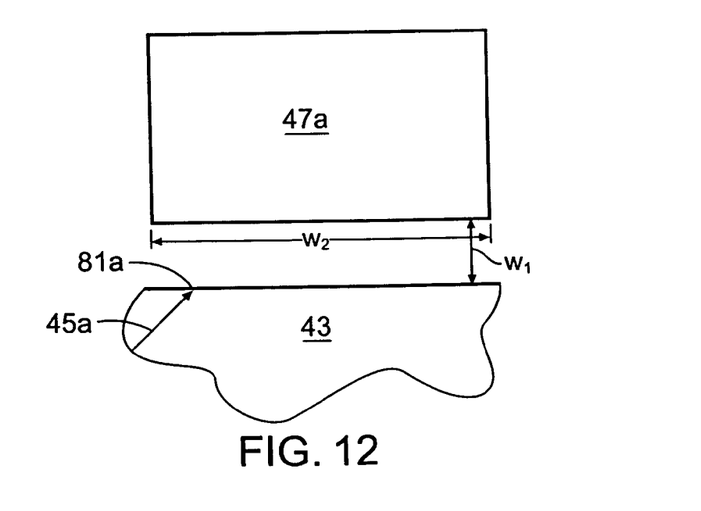
FIG. 12 is a detail view of the apparatus of FIG. 7.

If the apparatus 41 is a spectrometer, or if it is some other apparatus where the targets 47a-47d are used to detect the existence and/or magnitude of light exiting the PC 43 at a given exit point, it is preferred that the targets 47a-47d be positioned on or near the surface 46. FIG. 12 provides a detailed view of the positioning of the target 47a of the apparatus 41 of FIG. 7 to the PC 43. As can be seen, the distance W1 is the distance separating the target 47a from the PC 43. The distance W2 is the width of the target 47a. Also shown in FIG. 12 are the exit point 81a and the component beam 45a. In preferred embodiments, W1 is small or possibly zero. In some instances, the separation distance W1 will be achieved by sandwiching one or more transparent or translucent layers between the targets 47a-47d and the surface 46, while in others the separation will be maintained by structures holding the PC 43 and targets 47a-47d in place relative to each other.

The width W2 of a given target can be varied between embodiments. In some instances wider sensor targets will result in greater sensitivity to magnitude of light sensed by the sensor target but decreased wavelength sensitivity while a narrower target will result in decreased magnitude sensitivity and increased wavelength sensitivity.

In some instances the photonic crystal 43 may be a prism in that it is a solid figure whose bases or ends have the same size and shape and are parallel to one another, and each of whose sides is a parallelogram, and in that it is a transparent used for separating white light passed through it into a spectrum or for reflecting beams of light.

As the angle of incidence can also be used to compensate for undesired superprism effect, it is contemplated that in some instance one might utilize a method of orienting a photonic crystal comprising: (a) identifying a plurality of wavelengths; (b) obtaining a plurality of sets of data points, where each data point of each set of data points relates to an exit point position on the exit surface of a wavelength of the plurality of wavelengths, and each set of data points corresponds to an orientation of the photonic crystal; and (c) using the plurality of sets of data points to orient the photonic crystal.

Figure 13:
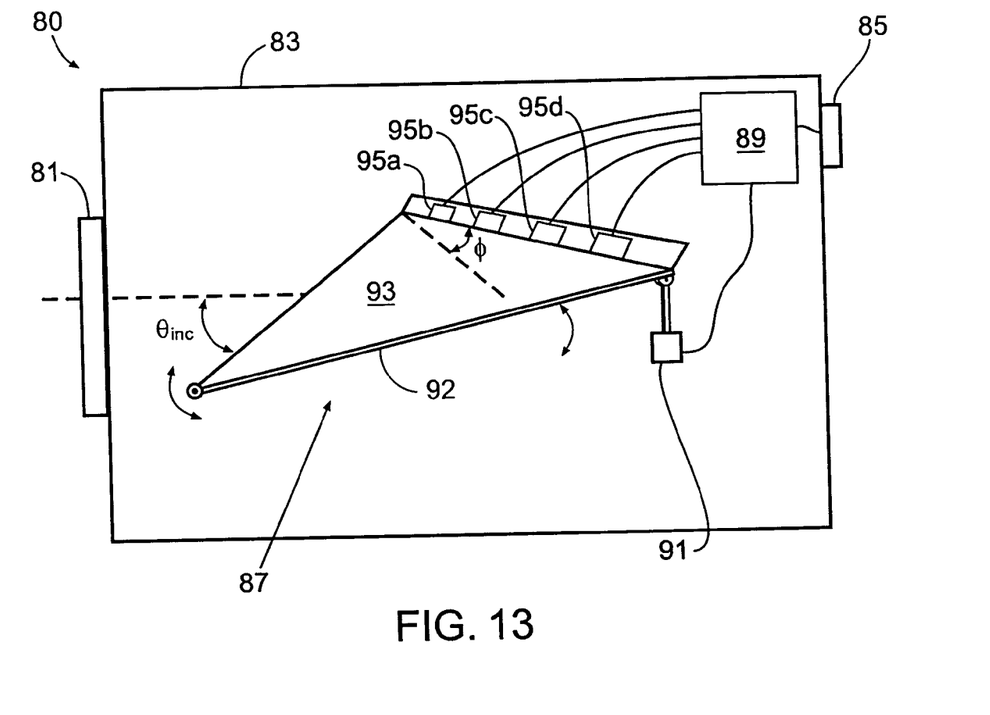
FIG. 13 is a schematic view of a sensor array apparatus in accordance with an exemplary embodiment of the invention.

In some instances, the orientation of a photonic crystal within an apparatus such as a spectrometer may be fixed, or may be manually or automatically variable. If manually variable, orienting a photonic crystal may be part of a calibration process where adjustment screws or other positioning devices are utilized to adjust the orientation of the photonic crystal. In other instances, orientation might be adjusted using an electronically controlled actuator or using some other orientation changing mechanism. In such an apparatus, the angle of incidence could be adjusted for different applications, for environmental changes, and/or for component changes. In FIG. 13, a spectrometer 80 includes an input lens 81, a body 83, and an output port 85. Within the body 83 is a controller 89 electrically coupled to the output port 85 and to an actuator 91. The actuator is coupled to a hinged support 92 on which is mounted a PC 93. Coupled to the PC 93 are sensors 95a-95d which are also electrically coupled to the controller 89. In the spectrometer 80 of FIG. 13, the controller can adjust the angle of incidence of light from the input lens 81 entering the PC 93 by controlling the actuator 91.

It is contemplated that in some instances, detectors positioned adjacent the photonic crystal may be movable relative to the photonic crystal to allow a limited number of detectors to be used to detect and/or measure different sets of wavelengths. In other instances, a larger number of detectors might be positioned side by side on the exit surface to provide a more general purpose detector array. In some instances, detectors may be very frequency specific and only suitable for detecting and measuring a single frequency or a small range of frequencies or may be suitable for detecting and measuring a larger range of frequencies. In the later instance, the detector may or may not be capable of distinguishing between individual or small ranges of frequencies.

The superprism effect of a photonic crystal ("PC") can be used to form an ultra compact spectrometer. Such a spectrometer can be formed using semiconductor fabrication techniques so that the resultant compact, integrated spectrometer can effectively be a spectrometer-on-a-chip. A 20-channel spectrometer-on-a-chip, according to an embodiment of the present invention, could measure only a few millimeters wide in its largest dimension.

It is contemplated that the methods described above can be used to produce an apparatus comprising a photonic crystal having at least an entry surface and an exit surface; where the entry surface and exit surface form an angle of between 70 degrees and 130 degrees. In some such instances, a cross section of the photonic crystal will have a substantially polygonal perimeter including at least 4 sides, with a first side of the perimeter corresponding to the entry surface, and a second side of the perimeter corresponding to an exit surface. In those or alternative instances, the photonic crystal may include four sides, a first side corresponding to the entry surface, a second side corresponding to the exit surface, a third side opposite the first side, and a fourth side opposite the second side; and the first and third sides are shorter than the fourth side. In some instances, the first and third sides will be substantially parallel and the fourth side is substantially perpendicular to the first and third sides.

It is contemplated that the methods described above can be used to produce an apparatus comprising a photonic crystal, and a plurality of light sensors positioned to sense light exiting a surface of the photonic crystal, the plurality of light sensors comprising a first end sensor, a second end sensor, and one or more intermediate sensors positioned between the first end sensor and the second end sensor. In some such instances, each intermediate sensor is separated from a first adjacent sensor by a first distance, is separated from a second adjacent sensor by a second distance, and the larger of the first and second differences is less than 10% larger than the smaller of the first and second differences.

It is contemplated that the methods described herein can be used to produce an apparatus comprising a photonic crystal, and a plurality of light sensors separated from each other by a pitch distance and positioned within about one half of the pitch distance of an exit surface of the photonic crystal. In some instances, the plurality of light sensors will be in contact with the exit surface. In some instances, one or more transparent or translucent members positioned between the plurality of light sensors and the exit surface of the photonic crystal. In some instances, the plurality of light sensors, one or more intermediate layers, and photonic crystal will be bonded to a supporting substrate.

What is claimed is:

1. A light sensing apparatus, comprising:
    a photonic crystal having a planar entry surface and a planar exit surface, the exit surface adjacent to the entry surface at a first angle;
    a light source, entering the entry surface at a second angle, dispersing from the entry surface into a plurality of separate wavelength beams, wherein the plurality of wavelength beams exit the exit surface at substantially equal distances from each other;
    one or more transparent or translucent members positioned on the exit surface of the photonic crystal; and,
    a plurality of light detectors arranged to measure the plurality of wavelength beams on the one or more transparent or translucent members.

2. The apparatus of claim 1 wherein the plurality of light detectors, one or more transparent or translucent members, and photonic crystal are bonded to a supporting substrate.

3. A light sensing apparatus, comprising:
    a photonic crystal having a planar entry surface and a planar exit surfaces, the exit surface adjacent to the entry surface at a first angle;
    a light source, entering the entry surface at a second angle, dispersing from the entry surface into a plurality of separate wavelength beams, wherein the plurality of wavelength beams exit the exit surface at substantially equal distances from each other; and,
    a plurality of light detectors arranged to measure the plurality of wavelength beams at the exit surface.

4. The apparatus of claim 3 where a cross section of the photonic crystal has a substantially polygonal perimeter including at least 4 sides, with a first side of the perimeter corresponding to the entry surface, and a second side of the perimeter corresponding to an exit surface.

5. The apparatus of claim 3 wherein the photonic crystal comprises four sides, a first side corresponding to the entry surface, a second side corresponding to the exit surface, a third side opposite the first side, and a fourth side opposite the second side; and the first and third sides are shorter than the fourth side.

6. The apparatus of claim 5 wherein the first and third sides are substantially parallel and the fourth side is substantially perpendicular to the first and third sides.

7. The apparatus of claim 3 wherein the apparatus is an optical detector array.

8. The apparatus of claim 3 wherein the apparatus is an integrated optical chip.

9. The apparatus of claim 3 wherein the apparatus is a spectrometer.

10. A method of normalizing distance points where at least three light beams having different wavelengths exiting a photonic crystal resulting from a light source entering the photonic crystal, comprising the steps of:
    introducing the light source at a first angle to a planar entry surface of the photonic crystal wherein the light source disperses into at least three light beams having different wavelengths, beam angles formed between each adjacent light beam, said beam angles being unequal;

providing a planar exit surface adjacent to the entry surface at a second angle, the second angle comprising between 70 and 130 degrees, wherein the at least three light beams exit;

adjusting the first and second angles.

11. The method of claim 10, wherein the second angle comprises greater than 90 degrees.

* * * * *